US007406355B1

(12) United States Patent
Morita

(10) Patent No.: US 7,406,355 B1
(45) Date of Patent: Jul. 29, 2008

(54) METHOD FOR GENERATING PLAYBACK SOUND, ELECTRONIC DEVICE, AND ENTERTAINMENT SYSTEM FOR GENERATING PLAYBACK SOUND

(75) Inventor: Toru Morita, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/488,373

(22) Filed: Jan. 20, 2000

(30) Foreign Application Priority Data

Jan. 21, 1999 (JP) ................................ P11-013508

(51) Int. Cl.
*G06F 17/00* (2006.01)
*G10H 1/00* (2006.01)
*G10H 1/36* (2006.01)
*A63H 5/00* (2006.01)
*G09B 15/00* (2006.01)
*H04L 7/00* (2006.01)

(52) U.S. Cl. ............................. 700/94; 84/609; 84/600; 84/484; 84/634; 375/372

(58) Field of Classification Search .................. 84/600, 84/601, 602, 603–606, 609–610, 649–650, 84/666, 484; 375/372; 700/94
See application file for complete search history.

(56) References Cited

U.S. PATENT DOCUMENTS 4,571,680 A * 2/1986 Wu ........................... 377/24.2
5,018,428 A * 5/1991 Uchiyama et al. ............. 84/616
5,132,955 A * 7/1992 Hanson ................... 369/47.16
5,428,528 A * 6/1995 Takenouchi et al. ........... 463/42
5,576,685 A * 11/1996 Saito ....................... 340/384.1
5,768,126 A * 6/1998 Frederick ..................... 700/94
5,787,397 A * 7/1998 Furuhashi et al. ........... 704/267
5,789,690 A * 8/1998 Furuhashi et al. ............. 84/633
5,908,997 A * 6/1999 Arnold et al. ................. 84/615
6,115,036 A * 9/2000 Yamato et al. .............. 715/723
6,238,291 B1 * 5/2001 Fujimoto et al. .............. 463/44

(Continued)

FOREIGN PATENT DOCUMENTS

EP 0 376 342 A2 7/1990

(Continued)

OTHER PUBLICATIONS

Notice of Reasons for Rejection mailed Nov. 21, 2006.

(Continued)

*Primary Examiner*—Vivian Chin
*Assistant Examiner*—Devona E. Faulk
(74) *Attorney, Agent, or Firm*—Katten Muchin Rosenman LLP

(57) ABSTRACT

A method and electronic device for obtaining clear playback sound that is faithful to the original sound, in which data and audio data are played back under control of a CPU, and in accordance with the played-back audio data, a timer, which generates a CPU interrupt signal, is controlled and said interrupt signal is dynamically altered. The sound data obtained in accordance with the CPU interrupt signal is emitted to a speaker, thereby causing the timing of the second data and the timing of the CPU interrupt signal to agree with each other, thus reducing the burden on the CPU, and generating a clear playback sound from the speaker.

17 Claims, 8 Drawing Sheets

U.S. PATENT DOCUMENTS 6,392,613 B1 * 5/2002 Goto .......................... 345/30
6,560,692 B1 * 5/2003 Kudo et al. .................. 712/23

FOREIGN PATENT DOCUMENTS

EP 376342 A2 * 7/1990
EP 0 463 409 A2 1/1992
EP 463409 A2 * 1/1992
EP 0 715 296 A2 6/1996
EP 0729131 8/1996
EP 0 780 827 A1 6/1997
JP 6-222786 8/1994
JP 7-163754 6/1995
JP 8-95711 4/1996
WO WO 98/48377 10/1998

OTHER PUBLICATIONS

Communication pursuant to Article 96(2) EPC dated Oct. 5, 2007, for corresponding European Application No. EP 00 900 829.3.

* cited by examiner

40

METHOD FOR GENERATING PLAYBACK SOUND, ELECTRONIC DEVICE, AND ENTERTAINMENT SYSTEM FOR GENERATING PLAYBACK SOUND

FIELD OF THE INVENTION

This invention relates to a method in which a clear playback sound that is faithful to the original sound can be formed by dynamically altering the interrupt period with respect to the CPU, and an electronic device and entertainment system that implement this method.

BACKGROUND OF THE INVENTION

In an information device such as an entertainment system as exemplified by a TV game machine, game data can be stored (saved) to or read (loaded) from a memory card that is provided. In using such a memory card, the card is inserted into the main unit (parent machine) of the information device. For this purpose, the memory card has an interface for connecting it with the main unit (parent machine) of the information device and a nonvolatile memory element for storing data.

FIG. 1A is a block diagram of the key parts of such a memory card. This memory card 10 has a control unit 11 for controlling its operation, a connector 12 for connecting it to a mounting terminal provided in a slot of the information device, etc. that is the main unit, and a nonvolatile memory 16 for storing data. Connector 12 and nonvolatile memory 16 are connected by control unit 11.

Control unit 11 is, for example, a microprocessor (so labeled in the diagrams). Used as nonvolatile memory 16 is, for example, a flash memory such as an EEPROM (electrically erasable and programmable ROM). A microprocessor is sometimes also used in the connection interface with the information-device parent machine as a control unit for interpreting the protocol.

FIG. 1B shows the control elements in control unit 11 of memory card 10. The memory card has a main unit connection interface 11*a* for connecting with the main unit (parent machine) of the information device, etc., and a memory interface 11*b* for inputting and outputting data to and from the nonvolatile memory.

A video game device stores game data, etc. in an auxiliary memory and has the function of reading it out again, and the memory card 10 is used as such a video game device auxiliary memory.

FIG. 2 shows an example of a video game device that uses a memory card as an auxiliary memory. Main unit 2 of this conventional video game device 1 has a disk mounting unit 3, which is accumulated in a roughly rectangular housing and in the center of which is mounted an optical disk, which is a recording medium on which video game application programs are stored, reset switch 4 for resetting the game at will, a power switch 5, an open button 6, which opens the cover of the disk mounting unit, and, for example, two slots 7A and 7B.

Memory card 10, which is used as an auxiliary memory, is mounted in slots 7A and 7B, and data such as the results of a game played on video game device 1 is sent from a control unit (CPU) 19, which is built into main unit 2, and is written into nonvolatile memory 16.

Multiple operation devices (controllers) not pictured can also be connected to said slots 7A and 7B, allowing multiple game players to play competitive games, etc. Simultaneously.

Instead of memory card 10 connected to memory card slots 7A and 7B of the present machine of the entertainment system, it has been proposed that a portable electronic device having the function of executing a TV game or other program be connected detachably. That is, it has been proposed that at least part or all of a program such as a TV game be downloaded, the program itself be executed, and if the program is a game in which characters appear, it be given the function of being able to allow the growth, etc. of the characters in the game.

Such a portable electronic device (child machine) can be used without modification as a portable information terminal, and by having a communication unit with other devices (parent machine or child machines), its range of application as an information terminal can be expanded, thereby leading to the stimulation of new demand for the entertainment system.

Such a portable electronic device must have the sound functions of producing music and sound effects in the portable electronic device itself in order to execute, separately and independently from the parent machine, TV games, etc. downloaded from the parent machine when it has been removed from the parent machine.

On the other hand, the functions, size, and price of a portable electronic device impose certain restrictions on the CPU and sound-system devices that it can have inside it.

Under these circumstances, it is desirable to obtain sound that is a clear, faithful reproduction of the original sound built into the game software.

Therefore an object of this invention is to provide a method for obtaining, in an electronic device, clear playback sound that is faithful to the original sound.

Another object of this invention is to provide, in an electronic device, sound functions by which playback sound can be obtained that is faithful to the original sound.

Yet another object of this invention is to provide an electronic device that has sound functions by which playback sound can be obtained that is faithful to the original sound.

Still another object of this invention is to provide an entertainment system that has a portable electronic device that has sound functions by which playback sound can be obtained that is faithful to the original sound.

SUMMARY OF THE INVENTION

The above objects of the present invention are attained by a method for generating a playback sound, wherein a CPU interrupt signal is dynamically changed in accordance with read-out sound data, the timing between said sound data and the timing said CPU interrupt signals is made to agree by sending to the speaker said sound data obtained in connection with said CPU interrupt signal, and clear playback sound is generated.

Also, in the method for generating playback sound, the period of the CPU interrupt signal is dynamically changed in accordance with the period of the read-out sound data, the timing between said sound data and the timing said CPU interrupt signal are made to agree with each other by sending to the speaker said sound data obtained in connection with said CPU interrupt signal, and a clear play-back sound is generated.

Further, in the method for generating playback sound, image data and audio data is played back under CPU control, the timer unit that generates the CPU interrupt signal is controlled in accordance with the played-back audio data, the interrupt signal is dynamically changed, the timing between said sound data and the timing said CPU interrupt signal are made to agree with each other, and the burden on said CPU is reduced, by sending to the speaker said sound data obtained in accordance with said CPU interrupt signal, and a clear playback sound is generated from said speaker.

Moreover, an electronic device according to the present invention comprises a timer unit that generates a CPU interrupt signal, a CPU unit that specifies the sound data by the timing of said interrupt signal, a D/A converter unit that converts said sound data to an analog signal, and a speaker that emits sound that corresponds to said analog signal, wherein said CPU unit controls said timer unit in accordance with the period of said sound data, dynamically changes the period of said CPU interrupt signal, causes the timing of the switching of said sound data and the period of said CPU interrupt signal to agree with each other, and generates a clear playback sound.

An electric device according to the present invention comprises a clock unit, a timer unit that is connected to said clock unit and generates an interrupt signal using a down-counter; an interrupt controller unit that is connected to said timer means; a CPU unit that is connected to said interrupt controller means; a bus controller means that is connected to said CPU means; a D/A converter means that is connected to said bus controller means; an amplification means that is connected to said D/A converter means; and a speaker that is connected to said amplification means, wherein said CPU means controls said down-counter based on the period of the sound data, generates said interrupt signal, determines the sound data based on said interrupt signal, emits sound data via said bus controller and said amplification unit to said speaker, and generates a clear playback sound.

Moreover, an entertainment system according to the present invention comprises a parent machine that has the function of executing programs; a portable electronic device, which is a child machine that is detachably mounted on said parent machine, and an interface for making an electrical connection with respect to said parent machine; said portable electronic device including a timer unit that generates a CPU interrupt signal, a CPU unit that specifies the sound data by the timing of said interrupt signal, a D/A converter unit that converts said sound data into an analog signal, and a speaker that emits sound in accordance with said analog signal.

DETAILED DESCRIPTION OF THE PREFERRED EMBODIMENTS

[Whole Entertainment System]

Figure 3:
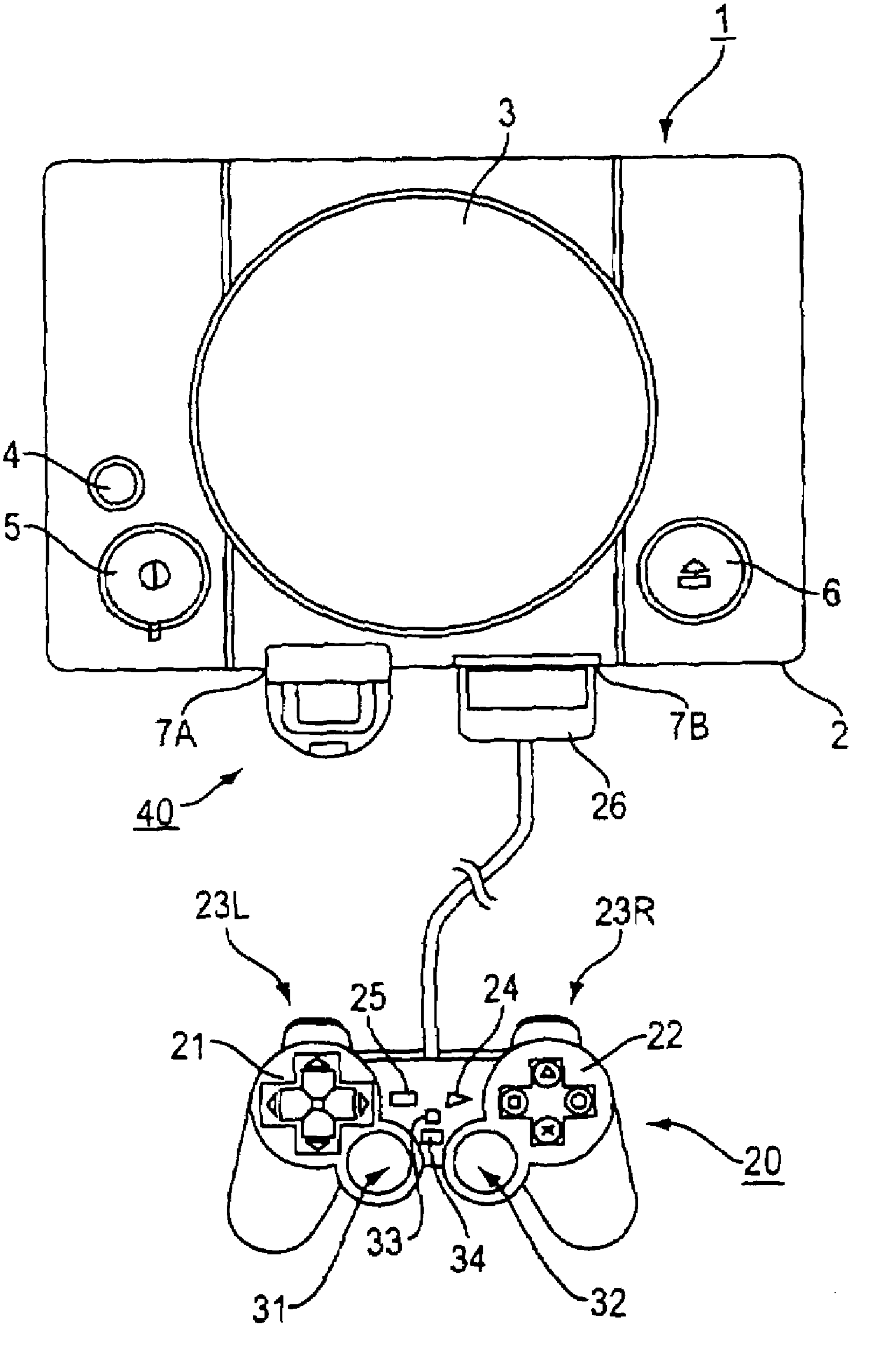
FIG. 3 shows an entertainment system comprising of a video game device (parent machine), a controller (child machine), and a portable electronic device (child machine)

FIG. 3 shows an overall external view of the entertainment system relating to this mode of implementation. The entertainment system has a video game device (parent machine) 1, a controller 20, which is connected to this video game device 1, and a portable electronic device (child machine) 40, which is connected detachably to the video game device 1 and is capable of data communication with the video game device 1.

Figure 4:
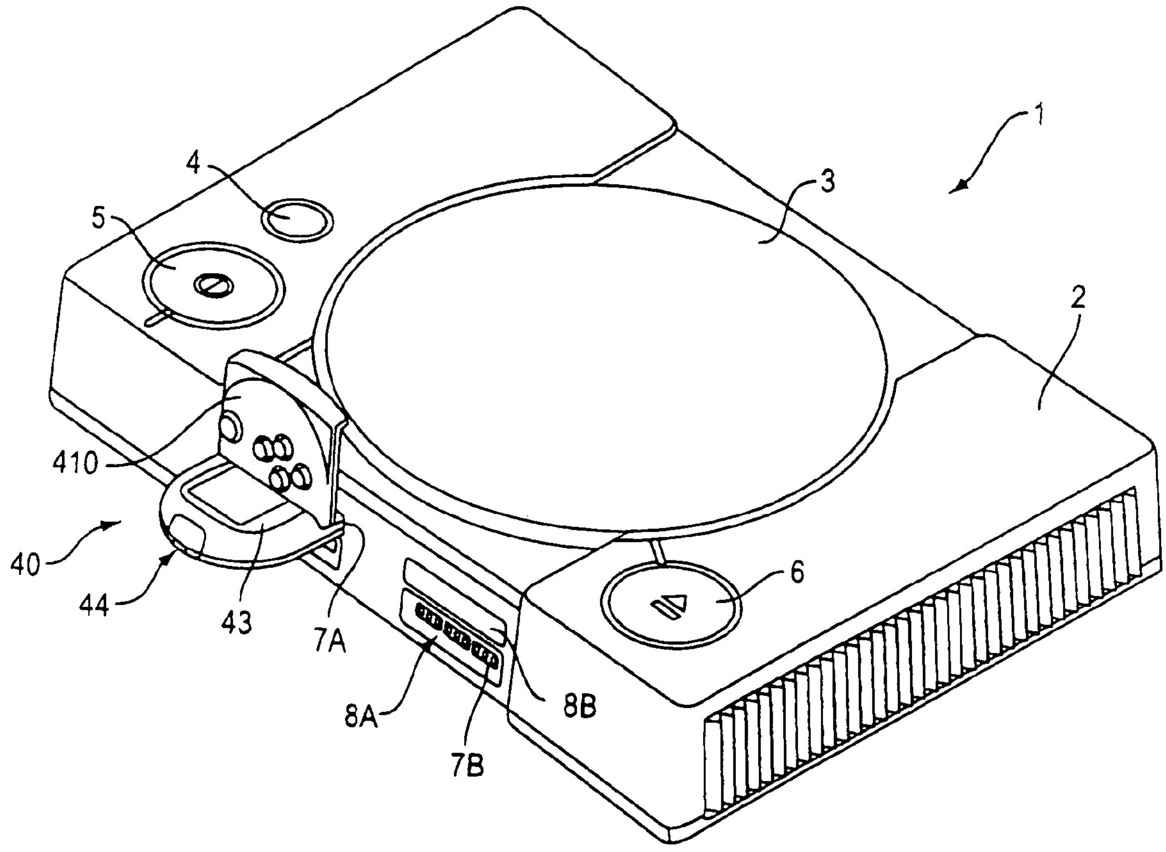
FIG. 4 is a perspective view of an entertainment system in the state in which the portable electronic device (child machine) is mounted on the video game machine (parent machine)

Video game device (parent machine) 1 shown in FIGS. 3 and 4 is configured for reading application programs, such as for example, a game software recorded on a recording medium such as an optical disk, and executing the software in accordance with instruction operations of the user (the game player) via controller 20. For example, by execution of the game, it performs mainly control of the progress of the game, display control, and audio control, etc.

As shown in the perspective view of FIG. 4, a main unit 1 of video game device 1 has a disk mounting unit 3, which is accommodated in a roughly rectangular housing and in the center of which is mounted an optical disk, such as a CD-ROM, which is a recording medium for supplying video game and other application programs, a reset switch 4 for resetting the video game at will at any time, a power switch 5, an open button 6 for performing the operation of mounting an optical disk, and two slots 7A and 7B.

Video game device 1 can be constructed so that it is supplied application programs via a communication circuit as well as from a recording medium.

Figure 1A:
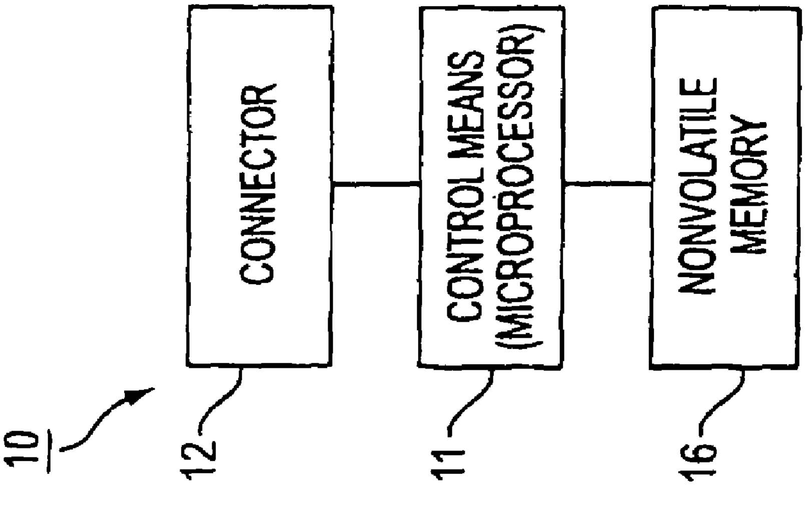
FIGS. 1A and 1B are block diagrams of a conventional memory card (child machine)
Figure 1B:
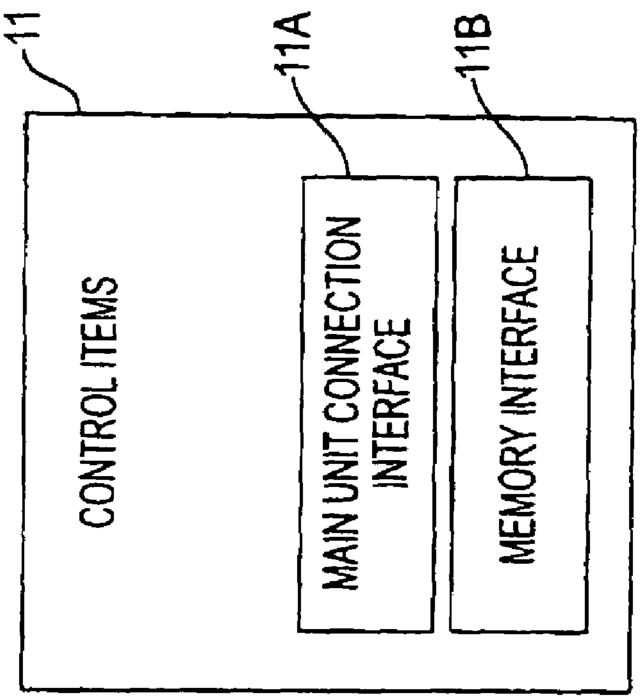
Figure 2:
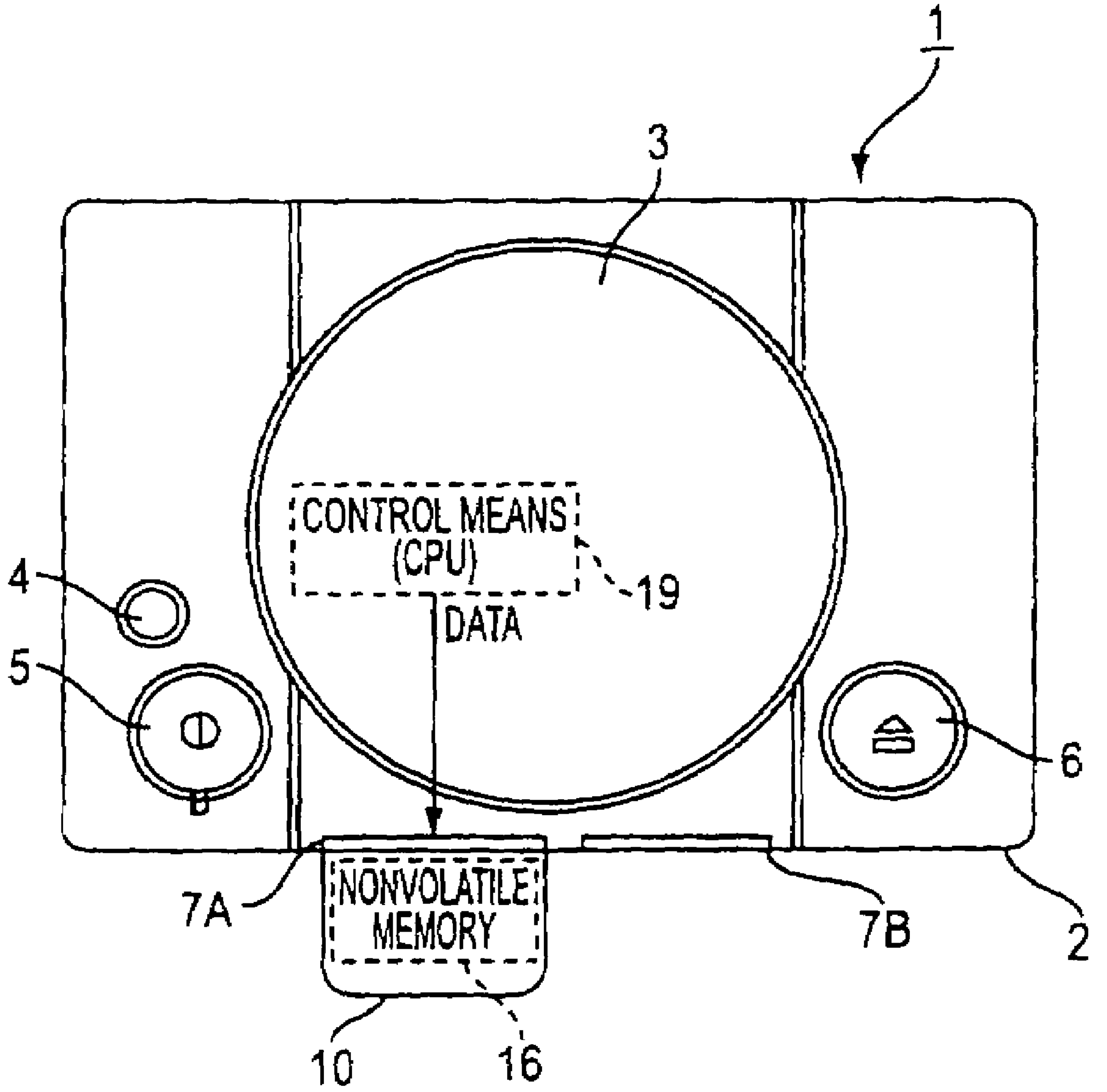
FIG. 2 shows the state in which the memory card of FIG. 1 is mounted on a video game device (parent machine)

The portable electronic device 40 and controller 20 can be connected detachably to slots 7A and 7B formed in the side of the housing. The game player can control the progress of the game using controller 20. A memory card (symbol 10 in FIG. 2) to which the content of the executed game can be recorded (saved) and from which the content of a recorded game can be read can be mounted in slots 7A and 7B.

As shown in the bottom half of FIG. 3, controller 20 has first and second operation units 21 and 22, left button 23L and right button 23R, a start button 24, a selection button 25, operation units 31 and 32 that are capable of analog operation, an analog/digital mode selector switch 33 that selects the operation mode of operation units 31 and 32, and a LED display unit 34 for displaying the selected operation mode.

Provided inside controller 20 is a vibration mechanism (not shown) that operates in an analog mode; it is made so as to give the game player a feeling of presence by vibrating controller 20 in response to, for example, a scene in the video game.

By connecting controllers 20 to slots 7A and 7B, respectively, two game players can share this entertainment system. For example, a competitive game can be played by two game players. The number of slots 7A and 7B is not limited to two as is the case here.

In an entertainment system constructed in this way, portable electronic device 40 can be detachably attached to parent machine 1 of the entertainment system.

[Portable Electronic Device]

(The Child Machine)

Figure 5A:
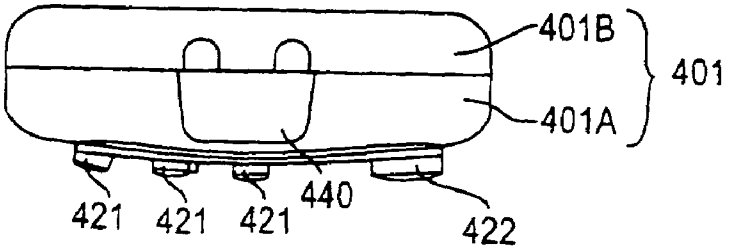
FIGS. 5A, 5B and 5C are plan, front and base views, respectively of a portable electronic device.
Figure 5B:
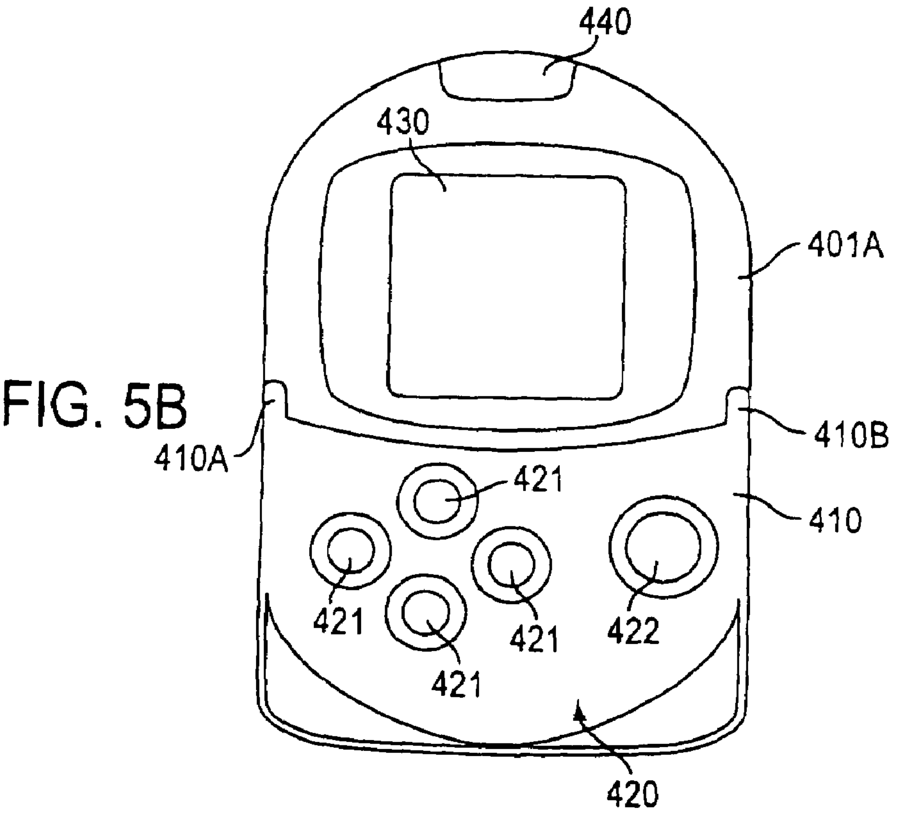
Figure 5C:
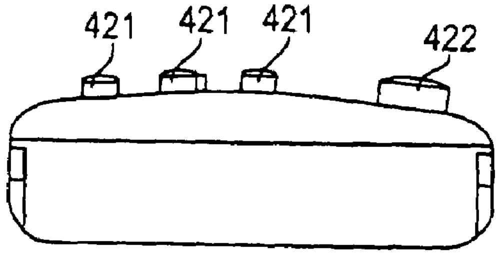

FIG. 5 shows the portable electronic device 40, FIG. 5A is a plan view, FIG. 5B being a front view, and FIG. 5C being a base view. The portable electronic device 40 has a housing 401 and has operation unit 420 for various information input, display unit 430, which consists of a liquid crystal display (LCD), and window 440 for performing communication by a wireless communication unit using, for example, infrared rays.

Housed inside housing 401, which consists of upper shell 401*a* and lower shell 401*b*, is a substrate on which are mounted a CPU, a D/A converter, memory elements, etc.

Housing 401 is shaped so as to allow insertion into slots 7A and 7B of the main unit (parent machine) of the entertainment system in the mode described in detail below.

Window 440 is provided at the other end of housing 401, which is formed in a roughly semicircular shape. LCD display 430 takes up about half the area of upper shell 401*a*, which constitutes part of housing 401, and is positioned near window 440.

On the upper surface part of housing 401, an operation unit 420 has one or more operation buttons 421, 422 for performing event input and making various selections, is formed in an upper shell 401*a* in the same way as window 440, and takes up about half the area of the side opposite the part where window 440 is positioned. Also, operation unit 420 is positioned on cover 410, which is supported rotatably about pivots 410*a* and 410*b* with respect to housing 401.

Operation buttons 421, 422 are arranged from the upper surface side to the lower surface side of cover 410 and pierce cover 410. Operation buttons 421, 422 can move in or out with respect to the upper surface part of cover 410 and are supported by cover 410.

Portable electronic device 40, which is inside housing 401, has a substrate positioned opposite the position of cover 410, and also has switch pressing units on top of the substrate. With cover 410 closed, the switch pressing unit are provided in positions corresponding to the positions of operation buttons 421, 422. Thus when operation buttons 421, 422 are pressed, the switch pressing units press pressing switches such as diaphragm switches.

[Connection with the Parent Machine]

As shown in FIG. 4, the portable electronic device (child machine) 40 can be electrically and mechanically connected, with cover 410 rotated about 90 degrees or more and in open state, by inserting the part formerly covered by the cover into one or both of slots 7A and 7B provided on the side of parent machine 1. By thus making an electrical connection with parent machine 1, a game player can download to child machine 40 all or part of TV game software that had been executed on the parent machine.

Thereafter, child machine (portable electronic device) 40 to which the game software has been downloaded can be taken out of slot 7A or 7B of parent machine 1, and the game can be played separately and independently. And after the game has been played to some extent, one can reconnect to parent machine 1, return the progress data of the game thus far to parent machine 1 (upload it), and the rest of the game can be played on parent machine 1.

[Configuration of the Child Machine]

Figure 6B:
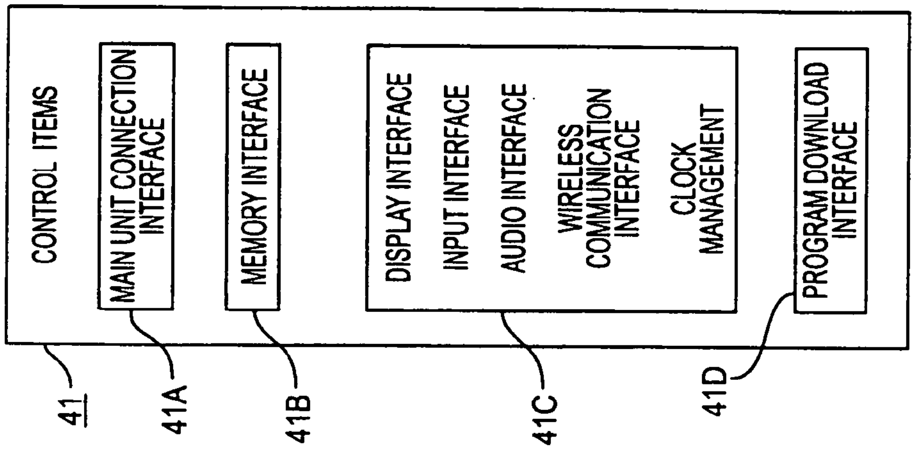
FIG. 6B shows the control elements of the control unit shown in FIG. 6A.
Figure 6A:
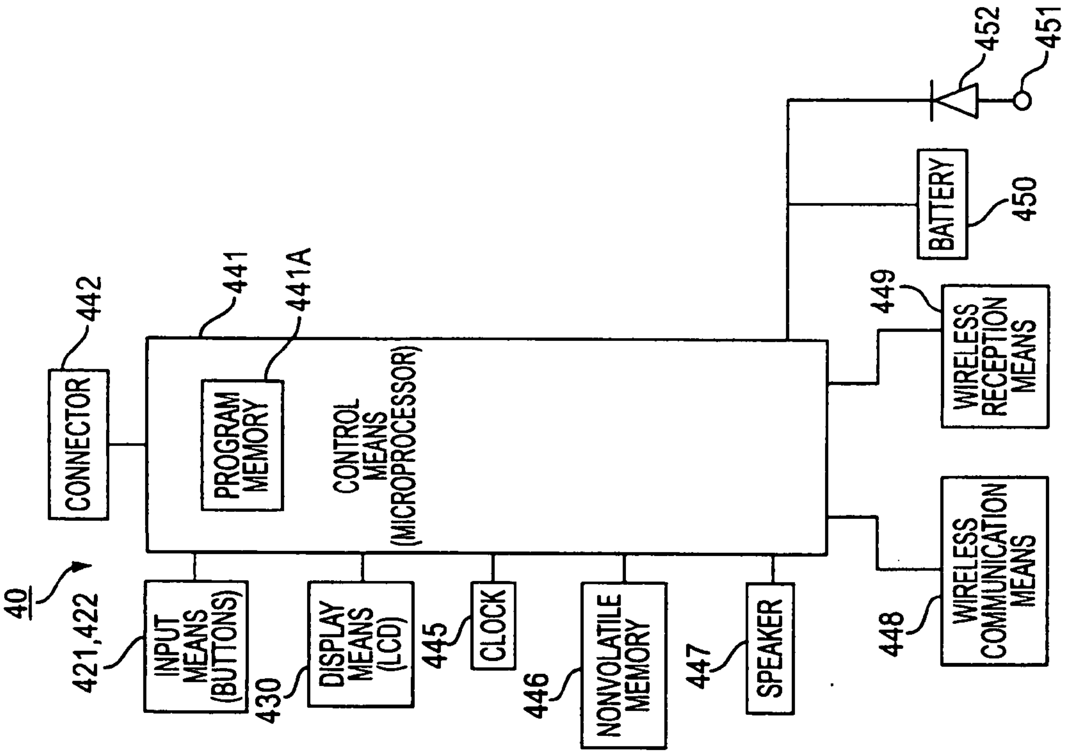
FIG. 6A is a block diagram of a portable electronic device.

FIG. 6 is a block diagram of portable electronic device (child machine) 40. Child machine 40 has a control unit 441, a connector 442, input units 421 and 422, a display (LCD) 430, a clock unit 445, a nonvolatile memory 446, a speaker 447, a wireless communication unit 448 as a data transmission and reception unit, a wireless reception unit 449, a battery 450, a power source terminal 451 and a diode 452 for a power storage unit.

Control unit 441 is, for example, a microprocessor (labeled as such in the diagram).

Connector 442 is a connection unit for connecting to the slot of another information device such as the parent machine 1, and it has a data communication function for sending and receiving data to and from the parent machine 1.

Input units 421 and 422 include operation buttons, etc. for operating a stored program.

Display 430 is a liquid crystal display (LCD), etc., which is a display unit for displaying various information.

Clock unit 445 is constructed so as to display the time; for example, it can perform time display to display 430.

Nonvolatile memory 446 is an element for storing various data. For example, one can use for nonvolatile memory 446 a semiconductor memory element, such as a flash memory, in which the stored state lingers even if the power is cut off. Therefore the portable electronic device 40 can also be like conventional memory card 10.

Because the portable electronic device 40 has battery 450, one can use as nonvolatile memory 446 a static random access memory (SRAM), which allows data to be input and output at high speed. Also, the provision of battery 450 makes it possible to operate the device independently even in the state in which it is removed from parent machine 1.

Battery 450 may be, for example a rechargeable secondary battery. With portable electronic device 40 inserted into the video game device, battery 450 supplies power from video game device (parent machine) 1. In this case, power source terminal 451 is connected to the connection terminal of battery 450 via the reverse current prevention diode 452, and power is supplied when it is connected to video game device main unit 2.

Wireless communication unit or means 448 is constructed so as to make it possible to perform data communication with another electronic device, etc. by, for example, infrared rays.

Wireless reception unit 449 is a part that is connected to have an antenna and demodulation circuit, etc. That is, it is the part that receives various data that is transmitted by wireless broadcasting.

The speaker 447 is constructed as a sound generation unit that generates sound in accordance with the program, etc.

All of the above parts are connected to control unit 441 and operate under the control of control unit 441.

FIG. 6B shows the control elements for the control unit 441. An ordinary memory card 10 has only a main unit connection interface 41*a* to parent machine 1 and a memory interface 41*b* for the input and output of memory data. The portable electronic device 40 has, in addition to these interfaces, a display interface, an operation input interface, an audio interface, a wireless communication interface, and a clock management (hereabove, 41*c*) and a program download interface 41*d*.

If, for example, the power of portable electronic device 40 is turned on, control unit 441 performs initialization of the operation confirmation, etc. of portable electronic device 40 as a whole, then executes the application program stored in a program memory 441*a*. By excitation of this application program, control unit 441 controls display 430, speaker 447, etc. in accordance with the input operation from the game player and controls the display of images and the generation of sound effects and music.

[Sound Interrupt Function]

With such portable electronic device 40, sound effects and music to match the display of images are generated in accordance with the progress of the game.

Figure 7A:
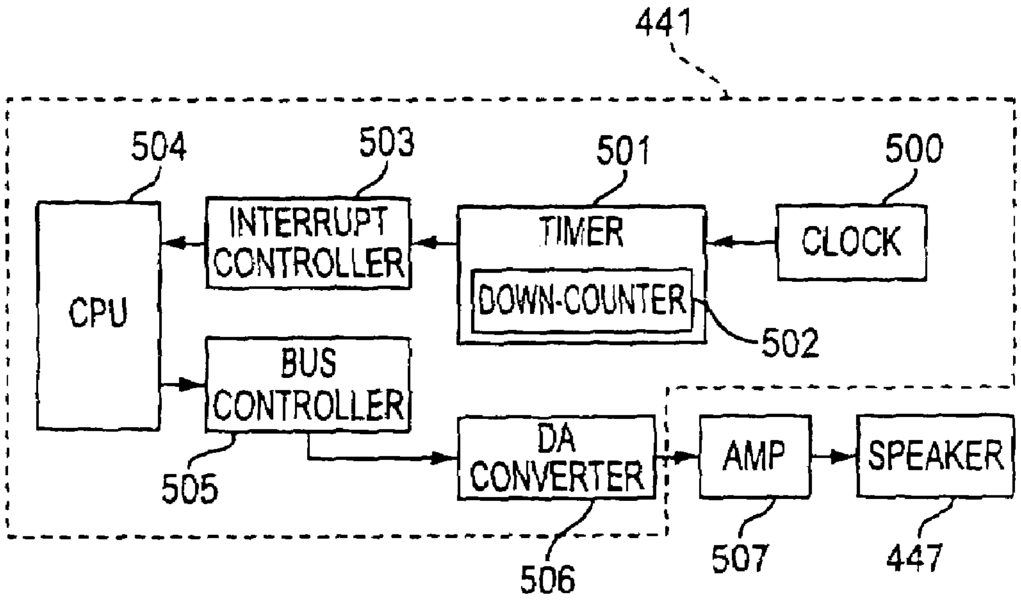
FIG. 7A shows the sound generation function blocks for a fixed-period CPU interrupt signal.

FIG. 7A shows the details of control unit (microprocessor) 441, specifically regarding the sound interrupt function for the generation of sound effects, etc. In connection with the sound interrupt function, control unit 441 has a clock unit 500; a timer unit 501, which is connected to this clock unit, has a down-counter 502 and determines the interrupt period; an interrupt controller 503, which is connected to the timer unit; CPU unit 504 which is connected to this interrupt controller unit and receives the interrupt signal; a bus controller 505, which is connected to the CPU; and a D/A converter 506 which is connected to this bus controller. Connected to the D/A converter 506 is an amplification unit (AMP) 507, and the speaker 447 is connected to the AMP 507.

The down-counter 502, in which a certain number is set, is decremented within the timer unit 501 by the clock signal form the clock unit 500, the prescribed interrupt period t is formed, and an interrupt signal is generated with respect to CPU 504 via the interrupt controller 503; that is, interrupt control is applied. CPU 504 is connected to a memory in which music or sound is recorded (for example, nonvolatile memory 446), and if there is a request to generate a sound effect at this interrupt period t in the program that is being executed, it reads the sound waveform data and sets the value of the sound waveform data in D/A converter 506 via bus controller 505.

Sound waveform data in digital format is converted to values in analog format in the D/A converter 506. This analog sound value is amplified by amplification unit 507 into an electric current value suitable for speaker 447 and drives the speaker.

Figure 8A:
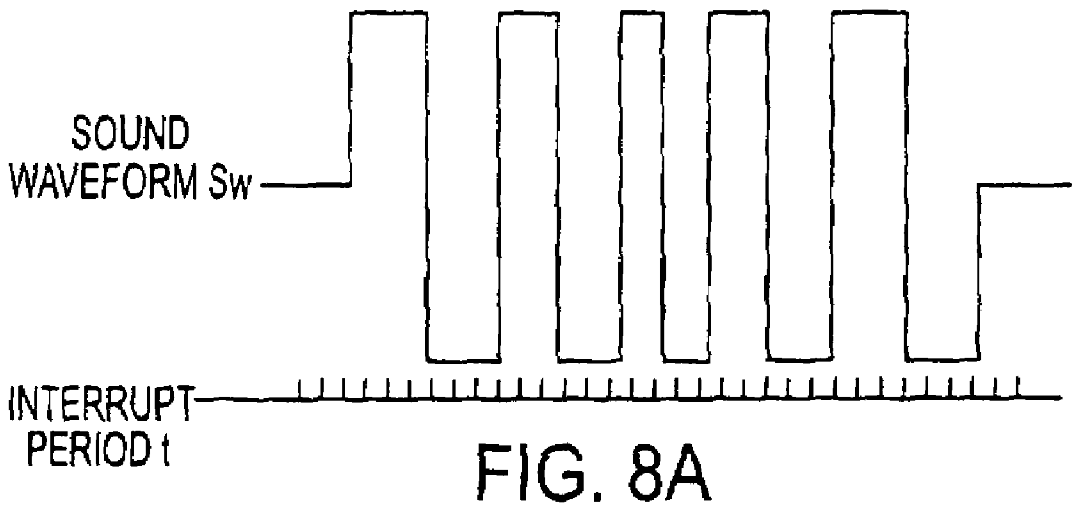
FIG. 8A shows the relationship between the sound waveform generated by the sound generation function blocks of FIG. 7A and the fixed-period interrupt period.

FIG. 8A is a conceptual diagram explaining the relationship between this fixed interrupt period t and sound waveform Sw. In general, in order to play music on the electronic device, to digitally reproduce a sound that originally forms a sine wave of analog values, a rectangular wave is used that faithfully is patterned after this sine wave. That is, sound waveforms Sw is formed by a rectangular wave (digital data) that closely approximates the original sound from the game software. Timer control unit 501 sends an interrupt signal to CPU 504 at a fixed period, and every time this is done the value corresponding to sound waveform Sw read by CPU 504 with this interrupt timing is set in D/A converter 506.

However, if the interrupt period t is thus fixed, the sound waveform Sw and interrupt period t will be generated separately and independently, with no correspondence or coordination between the two. As a result, the timing of the rise and fall of the rectangular wave that forms sound waveform Sw and the timing of interrupt period t will not agree, and a discrepancy will arise between the two timings.

Due to this slight mismatch of timing, the original sound written into the game software will not be faithfully reproduced. In such a case, when the spectrum of the sound emitted from speaker 447 is analyzed by FFT (fast Fourier transform), non-integer multiples of the fundamental frequency will be included in addition to the original sound (the fundamental frequency), which for example is 440 Hz denoting the musical tone "do" and its integral multiples (880 Hz, 1320 Hz, . . . ). Such a sound containing non-integral multiples of the fundamental tone sounds is very muddy to the human ear.

In this case, the interrupt period t is the resolution with respect to sound waveform Sw, so sound waveform Sw can be reproduced with greater fidelity by making interrupt period t very short. That is, it is possible to increase the possibility of a match between the timing of the rise and fall of the rectangular wave that forms sound waveform Sw and the timing of interrupt period t.

But shortening the interrupt period t will cause CPU 504 to be subjected to an interrupt with that much greater frequency, which will correspondingly increase the burden on CPU 504 which executes other control such as image control.

Specifically, to strike a balance between the demands for reproducibility of sound waveform Sw and for reducing the burden on CPU 504, the interrupt period t is normally set to about 23 to 90 microseconds. But even with such an interrupt period t, the position at which the amplitude of sound waveform Sw switches (the timing) will be slightly off from the original sound, resulting in a played-back wave that is slightly off from the original waveform and generating a playback sound in which non-integral multiples of the fundamental tone are mixed in.

Therefore it has been necessary to develop a method that can faithfully play back the original sound while reducing the burden on CPU 504, and a portable electronic device that can implement this method.

[Dynamic Modification of the Interrupt Period]

This invention has been devised, based on the discovery by the inventors that the original sound can be played back faithfully while reducing the burden on CPU 504 by dynamically altering (timing), in accordance with the original sound, the interrupt period t with respect to CPU 504.

Figure 7B:
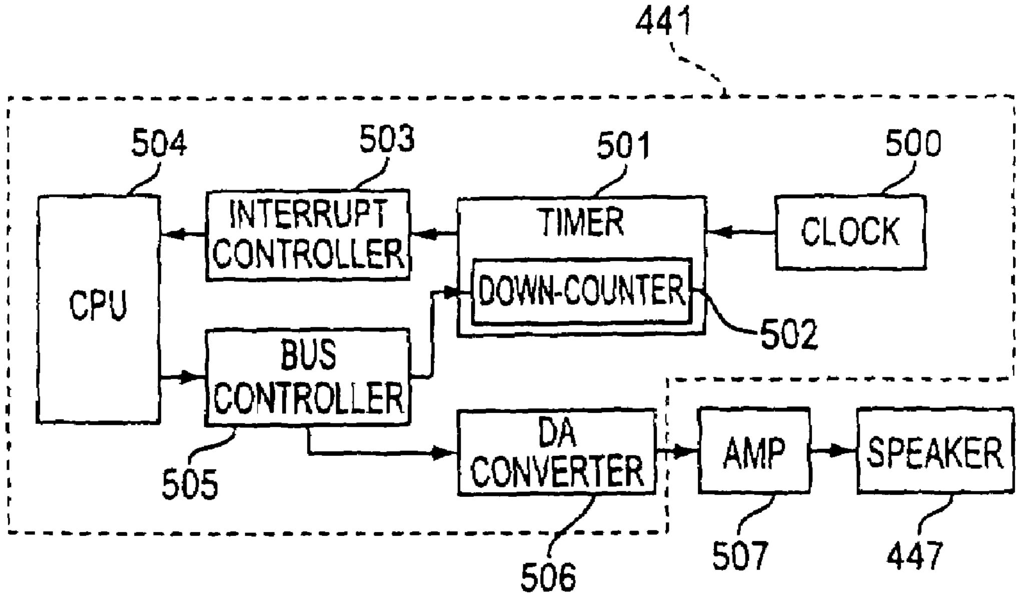
FIG. 7B shows the sound generation function blocks for which the period of the CPU interrupt signal is determined based on the sound waveform.

This is explained using FIG. 7B. In running the game software, when music, sound effects, or other sound generation information has been written into the game software, CPU 504, via bus controller 505, sets the down-counter 502 of timer unit 501 to a value that is determined based on the period T of this sound. For example, when the period of the sound is T, the down-counter 502 is set so that the interrupt period t is T/2.

As a result, by operation of interrupt counter 502, timer unit 501 generates an interrupt signal with respect to CPU 504 with interrupt period t=T/2.

Figure 8B:
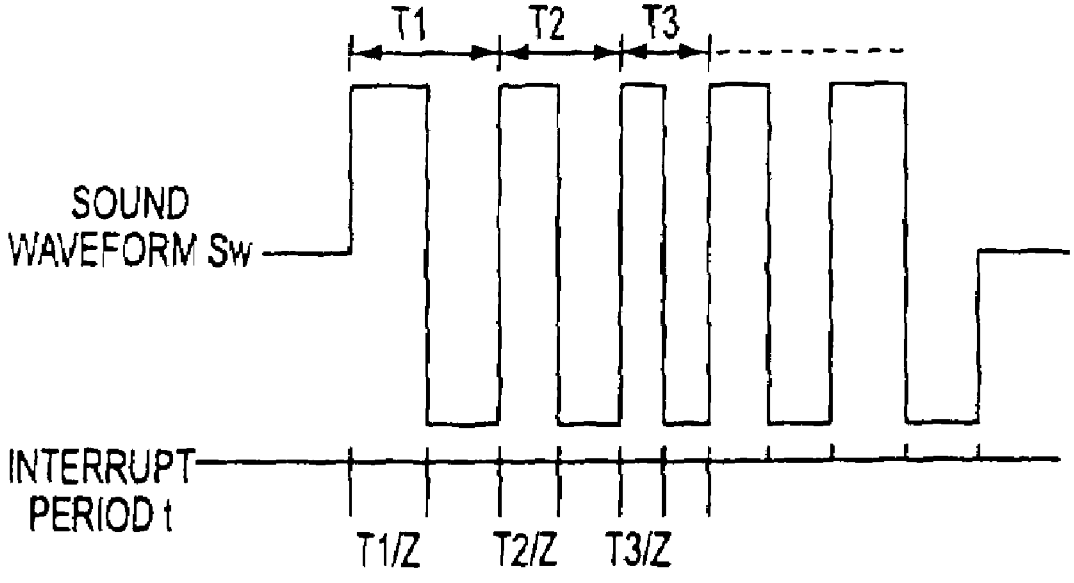
FIG. 8B shows the relationship between the sound waveform generated by the sound generation function blocks of FIG. 7B and a dynamically changing interrupt period.

FIG. 8B is a diagram that explains this situation. When sound waveform Sw is T1, interrupt period t is generated at t=T·½. Similarly, when, in the next stage, sound waveform Sw is changed to T2, interrupt period t is generated at t=T·2/2. By dynamically modifying interrupt period t in this way based on the sound waveform data of the original sound, the discrepancy between the timing of interrupt period t and the timing of the rise and fall of sound waveform Sw is completely or almost completely eliminated.

A further advantage of the present invention is that the half-period T/2 of sound waveform Sw is generally much longer than the usual fixed interrupt period t. That is, the dynamically altering interrupt period t=T/2 is much longer than the usual fixed interrupt period, so the frequency of generation of an interrupt signal with respect to CPU 504 is reduced, which greatly reduces the burden on CPU 504. Specifically, for a sound of frequency 1 kHz (period T=1/1000 second), it suffices to have an interrupt frequency of 2 kHz (period t=1/2000 second=500 microsecond). This results in a much smaller number of interrupts and a great reduction in burden on CPU 504 as compared with the 23 to 90 microseconds in the case where interrupt period t is fixed.

The resolution of the dynamically altering interrupt period is ultimately equal to the resolution of the timer unit, so the reproducibility of the sound waveform is the highest that is theoretically realizable. The result is clear playback sound that it faithful to the original sound.

Changing the interrupt period t to ½ the sound generation period is just a working example, and it should be noted that even if it is ⅓, ¼, . . . , etc. of the sound generation period, it falls within the scope of this invention as long as the burden on CPU unit 504 is reduced as compared with a fixed-period interrupt period.

The present invention is not limited to the portable electronic device in an entertainment system. It should be noted that this invention is technology that can be applied to all electronic devices that adopt the form of generating sound by generating an interrupt signal with respect to CPU 504.

This invention makes it possible to provide, in an electronic device, a method by which playback sound is obtained that is true to the original sound.

The present invention also make it possible to provide, in an electronic device, a sound function by which a playback sound is obtained that is true to the original sound.

The present invention also makes it possible to provide an electronic device that has a sound function by which a playback sound is obtained that is true to the original sound.

This invention also makes it possible to provide an entertainment system that has a portable electronic device that has a sound function by which a playback sound is obtained that is true to the original sound.

What is claimed is:

1. A method for generating a clear playback sound in an electronic device including a CPU and a speaker, the method comprising the steps of:

dynamically altering a CPU interrupt signal in accordance with a sound data that is read from a CPU memory; and emitting to a speaker of the electronic device said sound data obtained in connection with said CPU interrupt signal, wherein the timing between said sound data and the timing of said CPU interrupt signal are made to agree with each other to provide a clear playback sound;

wherein a period of said CPU interrupt signal is dynamically altered to T/n (where n=2, 3, . . . ) with respect to a period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

2. A method of generating a clear playback sound in an electronic device including a CPU and a speaker, the method comprising the steps of:

dynamically altering a period of a CPU interrupt signal in accordance with a period T of the sound data that is read from a CPU memory; and emitting to the speaker said sound data obtained in connection with said CPU interrupt signal, wherein the timing between said sound data and the timing of said CPU interrupt signal are made to agree with each other to provide a clear playback sound;

wherein the period of said CPU interrupt signal is dynamically altered to T/n (where n=2, 3, . . . ) with respect to period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

3. A method for generating a clear playback sound in an electronic device including a CPU and a speaker, the method comprising the steps of:

dynamically altering a period of a CPU interrupt signal in accordance with a period of the sound data that is read from a CPU memory; and emitting to the speaker said sound data obtained in connection with said CPU interrupt signal, wherein the timing between said sound data and the timing of said CPU interrupt signal are made to agree with each other to provide a clear playback sound;

wherein in said altering step the period of the CPU interrupt signal is dynamically altered in correspondence with a period T of said sound data, the period of the CPU interrupt signal is dynamically altered, and the period of said CPU interrupt signal is dynamically altered to T/n where n=2, 3, . . . , and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

4. A method for generating a clear playback sound in an electronic device including a CPU and a speaker, the method comprising the steps of:

dynamically altering a period of a CPU interrupt signal in accordance with a period of the sound data that is read from a CPU memory; and emitting to the speaker said sound data obtained in connection with said CPU interrupt signal, wherein the timing between said sound data and the timing of said CPU interrupt signal are made to agree with each other to provide a clear playback sound;

wherein in said altering step the period of the CPU interrupt signal is dynamically altered in correspondence with period T of said sound data, and the period T of said CPU interrupt signal is dynamically altered to T/2, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/2.

5. A method for generating a clear playback sound, in an electronic device including a CPU, a timer unit and a speaker, the method comprising the steps of:

reading image data and audio data under CPU control;

controlling said timer unit that generates a CPU interrupt signal in accordance with said read audio data to dynamically alter said CPU interrupt signal; and emitting to the speaker said sound data obtained in accordance with said CPU interrupt signal, wherein the timing between said sound data and the timing of said CPU interrupt signal are made to agree, the burden on the CPU is reduced, and a playback sound is generated from the speaker;

wherein the period of the CPU interrupt signal is dynamically altered in correspondence with a period T of said sound data and the period t of said CPU interrupt signal is dynamically altered to T/n where n=2, 3, . . . , and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

6. An electronic device comprising:

a timer unit that generates a CPU interrupt signal;

a CPU that specifies sound data by the timing of said CPU interrupt signal;

a D/A converter that changes said sound data to an analog signal; and a speaker that emits sound that corresponds to said analog signal;

said CPU controlling said timer unit in accordance with a period T of said second data, dynamically altering a period of said CPU interrupt signal, causing a switching timing of said sound data and the period of said CPU interrupt signal to agree, and generating a clear playback sound;

wherein the period of said CPU interrupt signal is dynamically altered to T/n (where n=2, 3, . . . ) with respect to period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

7. An electronic device comprising:

a timer unit that generates a CPU interrupt signal;

a CPU that specifies sound data by the timing of said interrupt signal;

a D/A converter that changes said sound data to an analog signal; and a speaker that emits sound that corresponds to said analog signal;

said CPU controlling said timer means in accordance with a period of said second data, dynamically altering a period of said CPU interrupt signal, causing a switching timing of said sound data and the period of said CPU interrupt signal to agree, and generating a clear playback sound;

wherein the period of said CPU interrupt signal is dynamically altered to T/n (where n=2, 3, . . . ) with respect to period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

8. The electronic device according to claim 7, wherein the period of said CPU interrupt signal is dynamically altered to T/2.

9. An electronic device comprising:

a clock unit;

a CPU;

a down-counter;

a timer unit connected to said clock unit and generates an interrupt signal using said down-counter;

an interrupt controller connected to said timer unit;

said CPU being connected to said interrupt controller;

a bus controller connected to said CPU;

a D/A converter connected to said bus controller;

an amplification unit connected to said D/A converter;

a speaker connected to said amplification unit; and an electronic means causing said CPU to control said down-counter based on the period of the sound data, generate said interrupt signal, determine the sound data based on said interrupt signal, emit the sound data via said bus controller and said amplification unit to said speaker, and generate a clear playback sound, wherein said CPU dynamically alters the period T of said interrupt signal to T/n where n=2, 3, . . . ) when the period of said sound data is T; and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n by said CPU.

10. The electronic device according to claim 9 wherein said CPU dynamically alters the period T of said interrupt signal to T/2 when the period of said sound data is T.

11. The electronic device according to claim 9, which is a portable electronic device that is detachably connected to a parent machine and can play a game independently when detached from said parent machine.

12. An entertainment system comprising a portable electronic device which is a child machine that is detachably mounted to a parent machine, and an interface for making an electrical connection to said parent machine, said portable electronic device comprising:

a CPU;

a timer that generates a CPU interrupt signal;

said CPU specifying a sound data by the timing of said CPU interrupt signal;

a D/A converter that converts said sound data to an analog signal; and a speaker that emits sound corresponding to said analog signal;

wherein the period of said CPU interrupt signal is dynamically altered to a T/n (where n=2, 3, . . . ) with respect to a period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

13. An entertainment system comprising a portable electronic device which is a child machine that is detachably mounted to a parent machine, and an interface for making an electrical connection to said parent machine, said portable electronic device comprising:

a CPU;

a timer that generates a CPU interrupt signal;

said CPU specifying a sound data by the timing of said CPU interrupt signal;

a D/A converter that converts said sound data to an analog signal; and a speaker that emits sound corresponding to said analog signal;

wherein a period of said CPU interrupt signal is dynamically altered to T/n (where T is a period of the sound data and n=2, 3, . . . ), and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

14. A method for generating a clear playback sound in an electronic device including a CPU and a speaker, the method comprising the steps of:

dynamically altering a CPU interrupt signal, that has been generated by a timer using a down-counter, in accordance with a sound data that is read from a CPU memory; and emitting to a speaker of the electronic device said sound data obtained in connection with said CPU interrupt signal, wherein the timing between said sound data and the timing of said CPU interrupt signal are made to agree with each other to provide a clear playback sound;

wherein said sound data has a period and wherein said CPU controls said down-counter based on the period of said sound data;

wherein a period of said CPU interrupt signal is dynamically altered to T/n (where n=2, 3, . . . ) with respect to a period T of said sound data; and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

15. A method for generating clear playback sound in an electronic device including a CPU and a speaker, the method comprising the steps of:

dynamically altering a period of a CPU interrupt signal, that has been generated by a timer using a down-counter, in accordance with a period T of the sound data that is read from a CPU memory; and emitting to the speaker said sound data obtained in connection with said CPU interrupt signal, wherein the timing between said sound data and the timing of said CPU interrupt signal are made to agree with each other to provide a clear playback sound;

wherein said CPU controls said down-counter based on the period T of said sound data;

wherein the period of said CPU interrupt signal is dynamically altered to a T/n (where n=2, 3, . . . ) with respect to period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

16. An electronic device comprising:

a timer unit that generates a CPU interrupt signal using a down-counter;

a CPU that specifies sound data by the timing of said CPU interrupt signal;

a D/A converter that changes said sound data to an analog signal; and a speaker that emits sound that corresponds to said analog signal;

said CPU controlling said down-counter in accordance with a period T of said second data, dynamically altering a period of said CPU interrupt signal, causing a switching timing of said sound data and the period of said CPU interrupt signal to agree, and generating a clear playback sound;

wherein a period of said CPU interrupt signal is dynamically altered to T/n (where n=2, 3, . . . ) with respect to a period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

17. An entertainment system comprising a portable electronic device which is a child machine that is detachably mounted to a parent machine, and an interface for making an electrical connection to said parent machine, said portable electronic device comprising:

a CPU;

a timer that generates a CPU interrupt signal using a down-counter;

said CPU specifying a sound data by the timing of said CPU interrupt signal;

a D/A converter that converts said sound data to an analog signal; and a speaker that emits sound corresponding to said analog signal;

wherein the CPU controls said down-counter based on a period of said sound data, and dynamically alters a period of said CPU interrupt signal, causing a switching timing of said sound data and the period of said CPU interrupt signal to agree, and generates a clear playback sound, wherein the period of said CPU interrupt signal is dynamically altered by said CPU to T/n (where n=2, 3, . . . ) with respect to period T of said sound data, and wherein the timing of interrupt corresponds to a rise or fall of a sound waveform of said sound data and discrepancy between the timing of said period of said CPU interrupt signal and the timing of the rise and fall of the sound waveform is substantially eliminated by said dynamically altering said period of said CPU interrupt signal to T/n.

* * * * *